Figure 1:
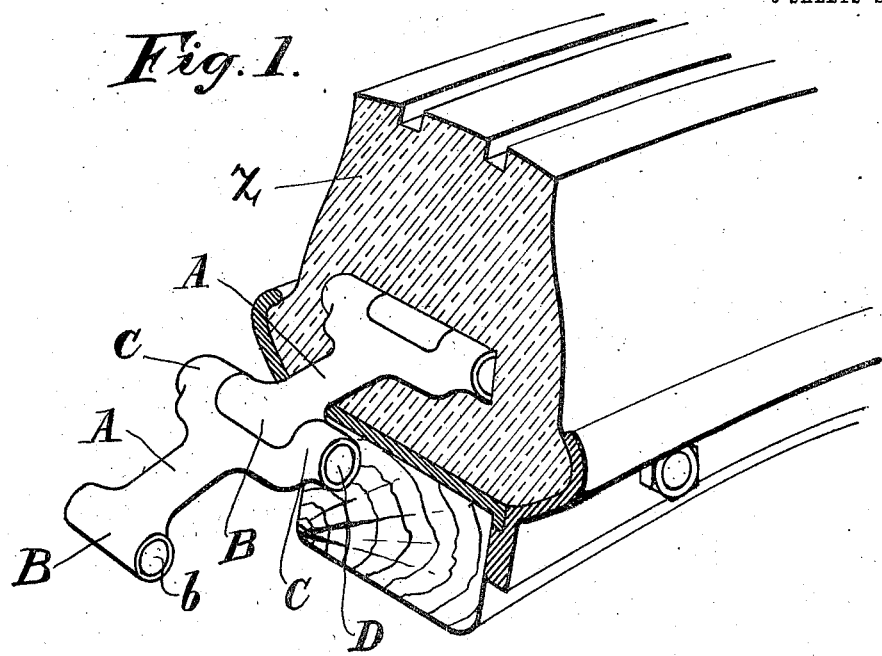

A. W. TORKINGTON.
TIRE FOR THE WHEELS OF ROAD VEHICLES.
APPLICATION FILED AUG. 26, 1910.

1,072,793.

Patented Sept. 9, 1913.

3 SHEETS—SHEET 1.

Witnesses
Paul H. Frank
Frank Tunstead

Alfred William Torkington
Inventor
by Dickerson, Brown, Raegener & Binney
his Attorneys

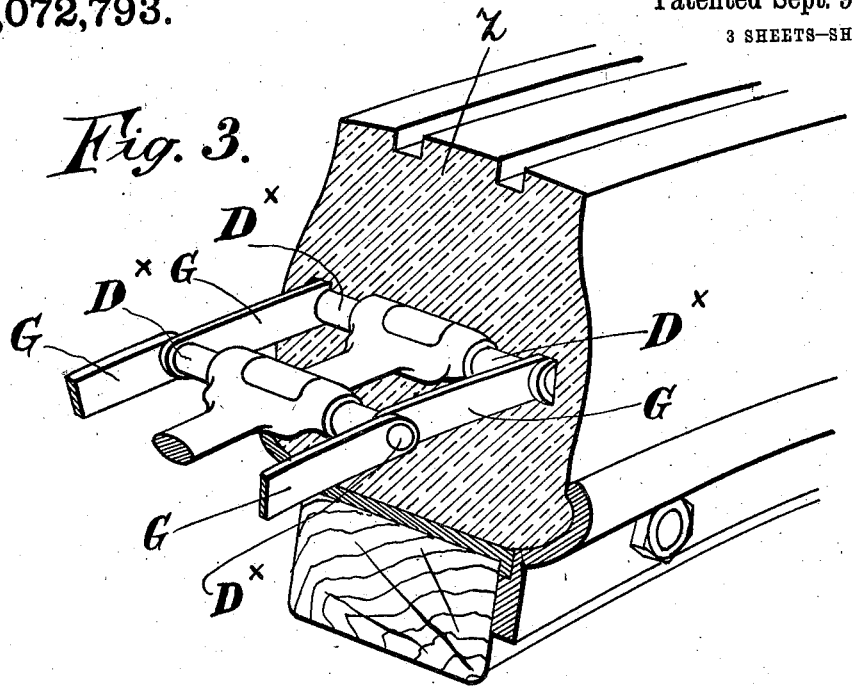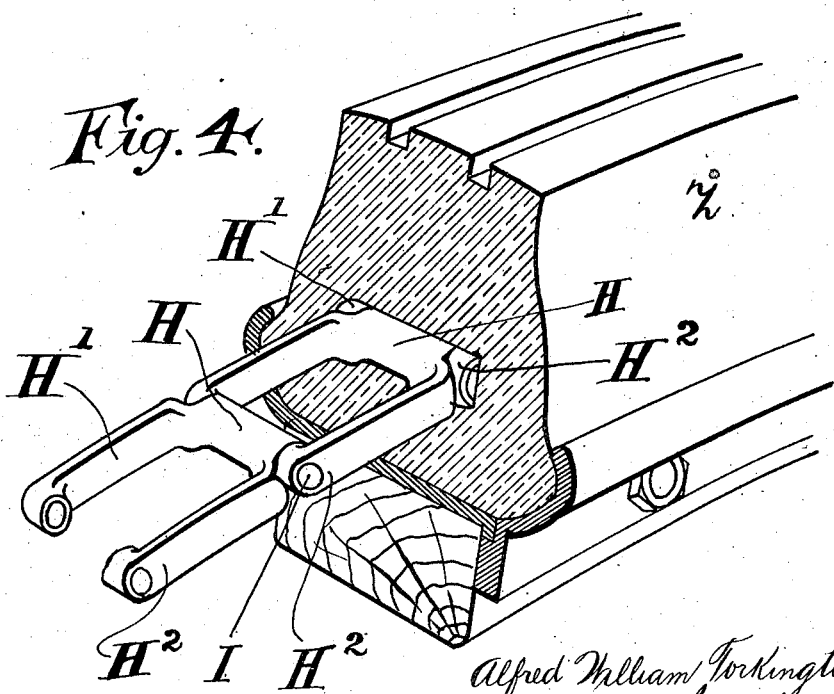

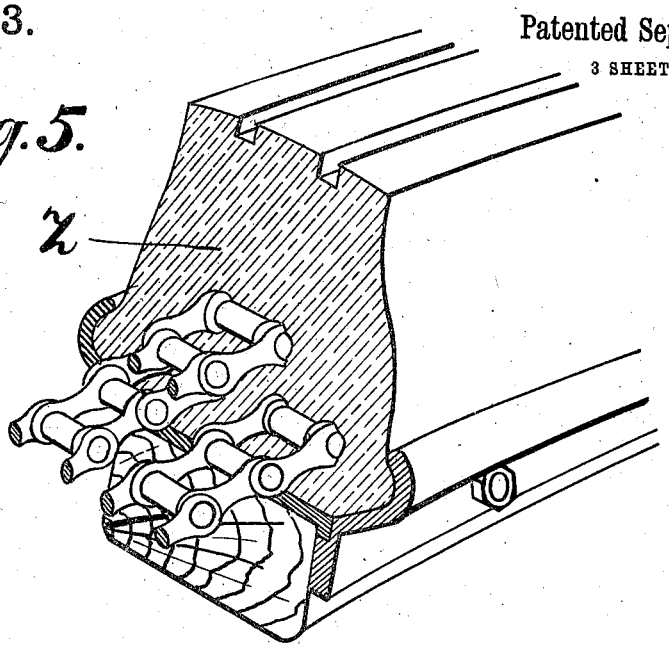
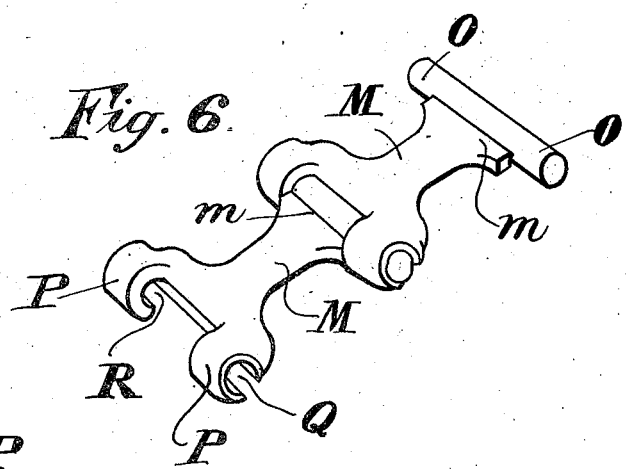
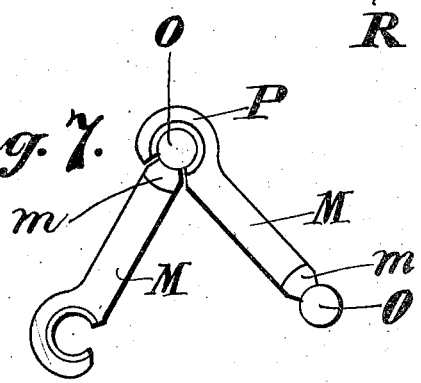

UNITED STATES PATENT OFFICE.

ALFRED WILLIAM TORKINGTON, OF LONDON, ENGLAND.

TIRE FOR THE WHEELS OF ROAD-VEHICLES.

1,072,793.　　　　Specification of Letters Patent.　　Patented Sept. 9, 1913.

Application filed August 26, 1910. Serial No. 579,083.

*To all whom it may concern:*

Be it known that I, ALFRED WILLIAM TORKINGTON, gentleman, a subject of the King of Great Britain, residing at "St. Austins," 258 South Norwood Hill, London, England, have invented certain new and useful Improvements in Tires for the Wheels of Road-Vehicles, of which the following is a specification.

This invention has for its object improvements in or relating to cushion or the like tires for the wheels of road vehicles.

Patent application filed November 16th, 1907, Serial No. 402,447 describes a cushion tire having oppositely positioned articulated floating rings applied externally on the opposite sides of the tire and said external rings forced toward one another by transverse bolts; such oppositely positioned articulated floating rings being illustrated in said patent as formed of a series of links.

In patent application filed July 3rd, 1908, Serial No. 441,905 there is described and illustrated a cushion tire having articulated floating rings applied externally on the opposite sides of the tire and forced toward one another by means of transverse bolts wherein the joints of said floating rings are located within the body of the tire; and in this patent there is illustrated a rubber tire having an articulated band forming the aforesaid joints located in a circumferentially arranged recess within the tire and having a series of plates carried by the said articulated band so constructed and arranged as to form and operate as external floating rings on each side of the tire as aforesaid.

Now in carrying out the present invention I dispense with external floating rings or external plates or other devices applied externally on each side of the tire and, according to the present invention, I employ an endless articulated floating ring or band (or rings or bands) of such a character and construction as to be adapted to bend or flex radially (*i. e.* radially to the axis of the wheel on which same is mounted) at each articulation or joint while incapable, or practically incapable, of lateral deformation or bending out of longitudinal alinement and also incapable, or practically incapable, of torsion or relative twisting movement between the links or members of such articulated ring or band and this latter (or a plurality thereof) is entirely embedded or located within the tire in suchwise that no part of said ring or band (or rings or bands) appears or comes to the exterior of the tire. This ring or band (or rings or bands) being embedded or located entirely within the solid rubber or other elastic tire such ring or band will permit a certain amount of movement or displacement of the substance of the tire body in which said ring or band is embedded or located but while acting in many respects in a similar manner to the articulated floating ring of the aforesaid patent application filed July 3rd, 1908, said ring or band according to the present invention will impart or tend to impart lateral stability to such tire and prevent or tend to prevent "rolling" occurring in such elastic tire which latter may be of any suitable dimensions.

I will now proceed to further describe my present invention with reference to the accompanying drawings in which:—

Figure 2:
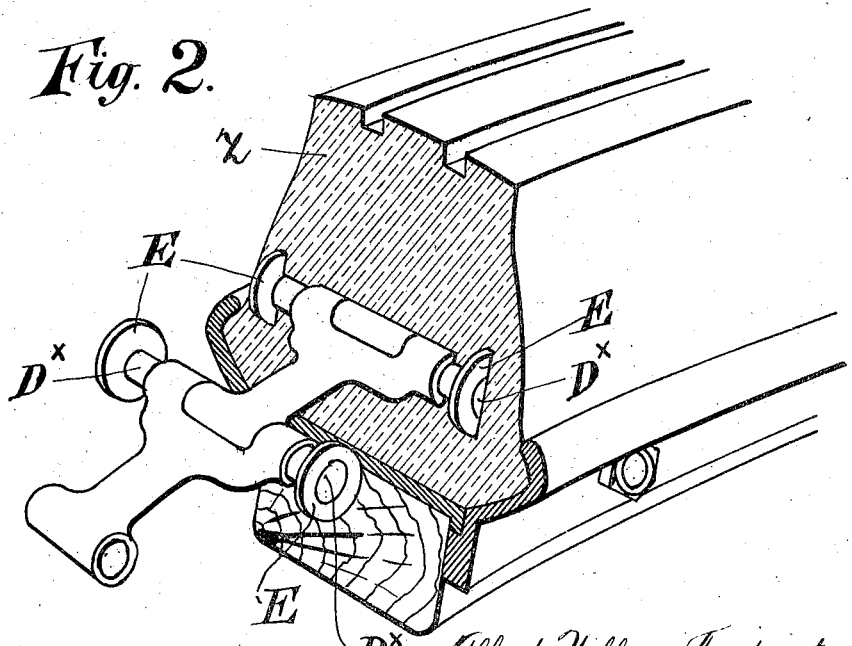

Figure 1 is a perspective view of an endless articulated floating ring or band constructed in accordance with the present invention and showing, in perspective, cross-sectional view, a felly and rim carrying therein a rubber tire in which latter said ring or band is embedded. Fig. 2 is a similar view to Fig. 1 but showing a modification in connection with said ring or band. Fig. 3 is a similar view showing another modification in which the endless articulated ring or band similar to that shown in Fig. 1 has prolonged hinge pins on the ends of which links are pivotally mounted as hereinafter further described. Fig. 4 is a similar view to Fig. 1 showing another construction of the endless articulated ring or band. Fig. 5 is a similar view to Fig. 1 showing a plurality of endless articulated floating rings or bands respectively embedded in different positions in the rubber tire. Fig. 6 is a local perspective view of two of the members of a modified construction of the ring or band shown in Fig. 1. Fig. 7 is an edge view of the arrangement shown in Fig. 6.

Referring now more particularly to Fig. 1:—Each articulated member of the endless ring may consist of a link A having at one end a cross head or T-head B provided with a hole *b* therethrough (*i. e.* transverse to the lengthwise direction of said link A) the other end of which link A is bifurcated or formed with a yoke C C each end of which latter is provided with a transverse hole; the space between the said bifurcated ends or yoke ends C being sufficient to admit thereinbetween the cross head or T-head B of the next adjoining link A, these two adjoining ends being secured together by a bolt or pivot pin D passed through both ends B and C C and secured in any suitable manner. In addition to this last-named construction shown in Fig. 1 I may if desired, prolong or extend the cross bolts or pivot pins D$^x$ (beyond the aforesaid hinge joints B C) as shown in Fig. 2; and I may if desired, as shown in Fig. 2, mount or arrange at or toward the ends of each said cross bolt or pivot pin D$^x$ a disk or plate E of any suitable size and shape, these disks or plates being substantially perpendicular to the tread surface of the tire and serving to greatly increase the area of the articulated band effective to prevent lateral distortion of the tire. Or as illustrated in Fig. 3 I may mount links on said prolonged cross bolts and pivot pins D$^x$ at each side the other end of each said link G being pivoted on the end of the next adjoining cross-bolt or pivot pin D$^x$ so as thus to form a continuous linked band or ring of links on each side of the main articulated ring or band formed of the aforesaid pivoted members A B C, these links G also being substantially perpendicular to the tread surface of the tire and serving to increase greatly the area of the articulated band effective to prevent lateral distortion of the tire.

In all cases the disks or plates E or links G, etc., carried on the ends of the cross bolts or pivot pins D$^x$ are advantageously of such size and dimensions as to be adapted to be entirely embedded or located and inclosed within the contour of the solid rubber or other elastic tire Z, i. e. so that no part of said articulated ring or band A B C or attachments thereto will appear on the exterior of said solid rubber or other elastic tire Z; although these parts or any of them can be brought close to the exterior if desired.

In place of the foregoing construction; I may as illustrated in Fig. 4, form each member of the articulated band or ring as a flat link H which is shown in the drawings as a U-shaped link or member but same may be solid if desired.

As shown in the drawings each link member H is approximately U-shaped the space between the ends of the two arms H$^1$ H$^2$ of the U-shaped member is sufficient to admit thereinbetween the opposite end of the next adjoining link H, and a bolt or pivot pin I is passed therethrough so as to connect said links H together. The arms H$^1$ and H$^2$ offer a very large area, substantially perpendicular to the tread surface of the tire, which area is effective to prevent lateral distortion of the tire. Or I may make such articulated ring or band of any other suitable form of links (flattened or otherwise) pivoted to one another in suchwise as to permit hinging or bending radially at each such pivot point while preventing lateral displacement and also preventing torsional or twisting movement between the respective links, for instance I may employ any of the well known forms of construction of driving chains (used in conjunction with sprocket wheels for transmitting motion) which may be suitable for my purpose such as illustrated by way of example in Fig. 5 which latter figure moreover shows a plurality of such articulated rings or bands embedded in the substance forming the rubber, or other elastic tire Z.

In Figs 6 and 7 I have illustrated a convenient method of constructing or joining together the links or members to form an articulated endless ring or band for embedding in the rubber or elastic tire according to this invention; the said construction illustrated in Figs. 6 and 7 being as follows:— Each link or member M is formed or provided at one end with a cross-pin O to form the hinge-pin or pivot pin, and the other end of said link or member M is bifurcated or formed as a yoke P each of which yoke members P is provided with a transverse passage adapted to receive therein the pivot pin O and also is provided with a slot or opening Q (see Fig. 6) of just sufficient size to pass edgewise into same the thin end portion $m$ of the link M (see Fig. 7); so that by placing each two adjoining links M into the position shown in Fig. 7 the cross pin O of the one link can be slid laterally into position and into engagement with the yoke pieces P of the next adjoining link, with the shank or main portion of the link M located between said yoke parts P; and then when the links are moved into a straight line as shown in Fig. 7 (or into any straighter line than in the position shown in Fig. 7) the said links will, as is obvious be securely joined to one another. Or I may employ any analogous or suitable construction of articulated endless ring or band (for embedding or locating wholly within the body of a solid rubber or other elastic tire) which is adapted to permit vertical compression or a limited vertical or radial movement of the elastic tire while said articulated endless ring or band is itself incapable—or practically incapable—of either lateral displacement or of relative torsional or twisting movement of the links or members forming such band or ring.

The complete articulated ring or band thus constructed may be embedded or located in a solid rubber or other elastic tire in any suitable manner during the process of forming the latter—or if desired after the latter has been formed; and if desired two or more of such bands may be embedded or located in such tire alongside of one another or superimposed or otherwise arranged within the body of the tire.

In claim 1 of the following claims, I employ the term "non-twisting articulated band" to distinguish chains or bands such as illustrated herein, and the construction of which is such that no material twisting is possible from chains so constructed that a considerable amount of twisting is possible.

I am aware that heretofore it has been proposed to embed a twistable chain in an elastic tire; but a chain which is capable of twisting does not resist materially lateral distortion or "rolling" of the tire; whereas a non-twisting chain, and particularly a chain having large lateral engagement with the material of the tire, does very effectively resist lateral distortion or rolling of the tire.

What I claim is:

1. The combination with an elastic tire, of an endless articulated band every part of which is entirely embedded within said tire, said articulated band formed of a series of links and pivot pins pivotally connecting adjacent links, such pivot pins and links having laterally-extended coacting bearing surfaces whereby material twisting of the articulated band is prevented.

2. The combination of an elastic tire and an endless articulated band every part of which is entirely embedded within said tire and comprising links and laterally-extending pivot pins pivotally connecting said links, said articulated band provided with members of large area, approximately perpendicular to the tread surface of the tire and embedded within the elastic material of such tire, whereby the area of the surface engagement of the band with the tire, effective to prevent lateral distortion of the tire, is increased.

3. The combination with an elastic tire of an endless articulated band every part of which is entirely embedded within the tire and comprising a series of links and pivot pins pivotally connecting adjacent links, said pins provided at their ends with enlarged heads located approximately perpendicular to the tread surface of the tire, whereby the area of the surface engagement of the band with the tire, effective to prevent lateral distortion of the tire, is increased.

In witness whereof I have hereunto set my hand in the presence of two witnesses.

ALFRED WILLIAM TORKINGTON.

Witnesses:
 EDWIN GANDER,
 HERBERT D. JAMESON.